April 24, 1928.
P. A. SCHERER
HANDLING FRUIT
Filed April 11, 1927
1,667,132
2 Sheets-Sheet 2
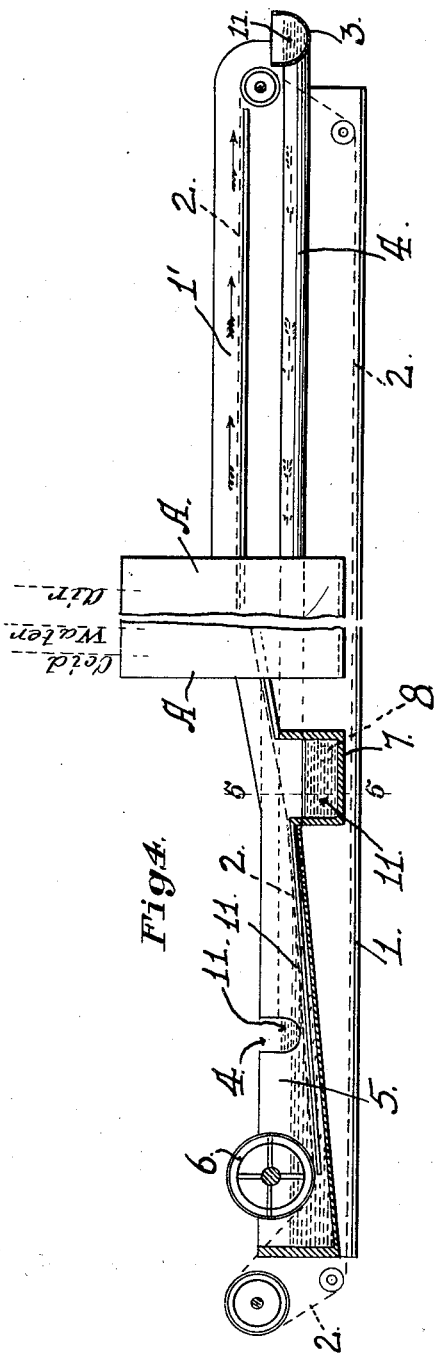
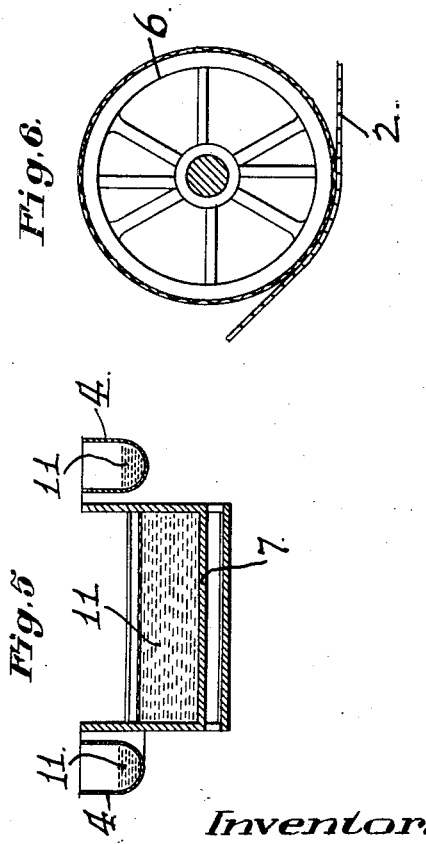
Inventor,
Paul A. Scherer
By Booth & Booth
Attorneys.

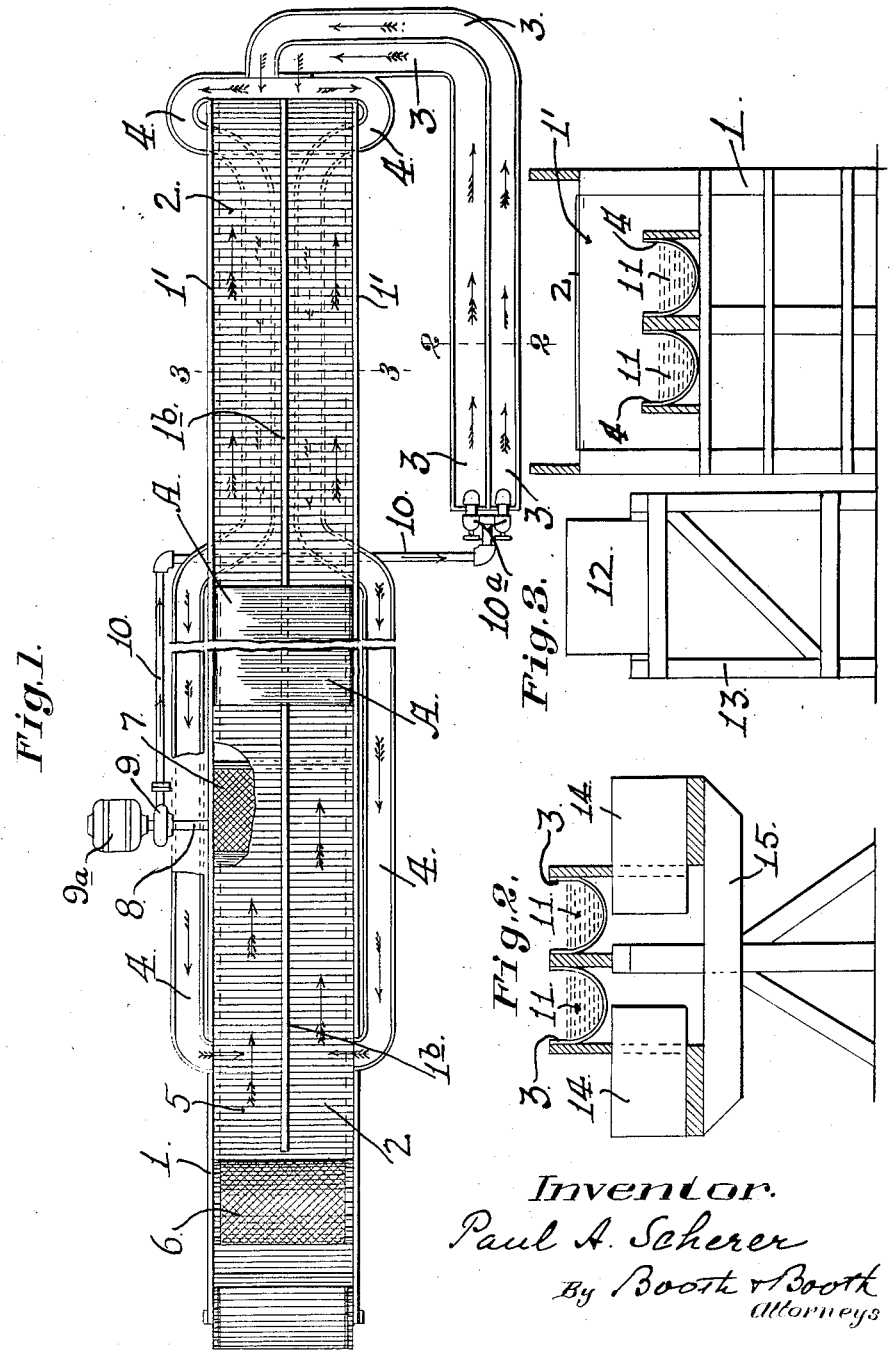

Patented Apr. 24, 1928.

1,667,132

UNITED STATES PATENT OFFICE.

PAUL A. SCHERER, OF MEDFORD, OREGON.

HANDLING FRUIT.

Application filed April 11, 1927. Serial No. 182,921.

My invention relates to the handling of fruit, especially with regard to the preparation, for shipment, of fresh fruit, under such authoritative regulations as provide for the removal, by washing, of all possibly remaining traces of spray solutions.

In conforming to such regulations, it is customary, preparatory to packing the fruit, to pass it through a zone or zones in which it is subjected to the washing effect of a suitable cleansing liquid or liquids, and then through a drying zone.

Modern methods require speed in order to handle, in brief space of time, large crops; and this has heretofore involved certain manipulations having deleterious effect upon the fruit. One of these manipulations is the dumping of the fruit, in comparatively large aggregates, into the apparatus, resulting in injury, especially pronounced, in fruits of tender nature.

One of the objects of my invention herein is to obviate this disadvantage by avoiding any dumping action whatever in introducing the fruit. Another object is to provide, during the progress of the introduction, against injurious contact of individuals. Another object is to provide for the return, without injury, of an intentional excess or surplus of fruit beyond the packing capacity of the operatives, and its re-introduction to the apparatus, so that the operation may be continuous, and proportionate to the labor available. Another object is to provide for a desirable cleansing treatment of the fruit during a proper time interval of its passage from the place of its initial introduction to the apparatus to the zone of washing and drying treatments. Still another object is to provide for the simultaneous handling of a plurality of grades, initiated by the selective sorting action of the operatives supplying the fruit. These and other objects will hereafter more fully appear, and be commented upon.

To attain these objects, my invention may be briefly stated to comprise a flowing liquid stream or a plurality thereof, to which the fruit, preferably sorted, is supplied, and by which it is moved forward; and means for picking the fruit up from the stream and advancing it through the treating zones to a packing table, said table delivering a predetermined excess or surplus of the treated fruit to the feeding stream or streams.

In the accompanying drawings, I show one form of apparatus embodying my invention, though it is to be understood that changes in details of structure, proportions and arrangement may be made without departing from the spirit of the invention as defined in the claims hereunto appended.

In the drawings, Fig. 1 is a top plan view of my apparatus.

Fig. 2 is a cross section of the feed troughs on the line 2—2 of Fig. 1, showing the stand and lug boxes from which the operatives initially feed and sort the fruit.

Fig. 3 is a cross section of the packing table on the line 3—3 of Fig. 1, showing one of the stands and the shipping box at which a packing operative is stationed.

Fig. 4 is a longitudinal section of the apparatus.

Fig. 5 is a cross section on the line 5—5 of Fig. 4.

Fig. 6 is a detail view showing the carrier passing under the directing wheel.

1 is a frame in which is mounted an endless traveling conveyer 2. In suitable position in the length of the frame, I have indicated diagrammatically at A and have inscribed in Fig. 2, successive treating zones as "acid," "water" and "air," meaning thereby to convey the understanding that a cleansing acid, such as dilute hydrochloric acid, a cleansing liquid such as water, and drying elements such as air are present in said zones in any accepted form of application having for their function the washing and drying of the fruit carried by the conveyer through said zones. As my invention is not concerned with the form or details of these or any other treating elements nor of the manner of their application, I have not deemed it necessary to illustrate them other than as here indicated. The frame 1 beyond these zones is extended to form a packing table 1' beside which the operatives are stationed, and who remove from the conveyer the cleaned and dried fruit and place them in shipping containers, one of which is shown at 12 on a stand 13 in Fig. 3.

Mounted longitudinally of the frame and depending above the conveyer throughout its length is a partition 1ᵇ separating the length of the apparatus into two sides.

At one side of the frame are the feeding troughs 3, two being here shown. These troughs lead to the foot of the packing or work table 1', where they join return troughs 4 extending backwardly on each side, and discharging into a tank 5 in the head end of the main frame 1, said tank being divided by the vertical partition 1ᵇ into two sides, with which the troughs 4 respectively communicate. The head end of the conveyer 2, by means of the directing wheel 6 dips into said tank 5 and rises upwardly therein to its normal level, as seen in Fig. 4; and as shown in Figs. 1 and 5, said conveyer fills the width of the tank. The tank 5 has a screen covered sump compartment 7, from which the suction pipe 8 of a pump 9 driven by a motor 9ᵃ leads. The discharge pipe 10 from said pump leads over to the feeding troughs 3 and is fitted with controlling valves 10ᵃ. A body of water indicated by 11 forms a flowing liquid stream in the troughs 3 and 4, tank 5 and sump 7; and said stream is a circulating one through the pump 9.

In the use of the apparatus, an operative, one or more, takes position at the head of the feed troughs 3, and from lug boxes 14 on a stand 15, Fig. 2, takes the fruit by hand and selectively sorts it into two grades, throwing out the culls, and placing one grade in the water stream 11 in one receiving trough 3 and the other grade in the other receiving trough. The fruit is thus deposited in the water stream without injury and is floated along through the troughs 3 without injurious contact between individuals or with the trough walls, the two grades being kept separate each in its own trough. The troughs 3 deliver the fruit into the return troughs 4 which deliver it to the tank 5, without injury, directly upon the conveyer 2, and in this tank said fruit, each grade on its own side, is picked up gently by the upwardly rising head end of the conveyer 2 and carried along thereon, each grade still on its own side of the longitudinal partition 1ᵇ of the frame, through the cleansing and drying zones, and out to and over the packing table 1'. On each side of this table sit the packers, who by hand remove the fruit and place it in shipping containers 12, Fig. 3. It is intended to supply the apparatus with more fruit than the packing operatives can remove, thus causing them to work at full capacity. The excess or surplus of fruit is delivered from the foot of the conveyer to the liquid streams in troughs 4, and returned safely with the main fruit feed and without injury to the tank 5 to be again carried through the machine.

In the method herein contemplated in using the apparatus it is intended to supply the liquid stream 11 with a suitable cleansing agent or agents, a disinfectant, for example, or other treating agent, for instance formaldehyde or dilute hydrochloric acid or both; and it will be noted that the employment of such a stream conduces to this end; and moreover by adopting for its course a relatively long distance, sufficient time may be had for the proper effect of the disinfectant or other cleansing agent; the term cleansing agent being herein used to include not only disinfectants but also other chemicals adapted to soften and prepare for removal any deleterious or insanitary matters or conditions.

It is a well known fact in the fruit trade and to the public generally that one of the greatest losses in the fruit industry comes from decayed fruit. Disinfectants have been discovered that are safe to apply to fruit, but usually require a treatment of about five minutes submersion, and unless such a process can be carried on while the fruit is in motion, and in conjunction with a system for drying, the expense, and the loss from rot caused by moisture is prohibitive.

In my method one gallon of formaldehyde, for example, can be added to 100 gallons of water and in the course of five minutes during which this fruit is traveling in the trough of water from the sorter to the zone in which the various other treatments are to be done the fruit has become sterile against various types of blue mold, brown rot, perennial canker, anthracnose, and other forms of vegetable growth common to packed fruit.

In operation, a little storage of the fruit is necessary to be certain at all times to have the tank full to completely cover the traveling conveyer. Therefore, if the tank is filled the fruit backs up in the troughs, and the result is that a capacity of any given unit is increased 20 to 30% over that possible in hand loading where the fruit is dumped from boxes.

On the packing end it is equally important that all packers have at all times a full supply of fruit; therefore, a slight excess of fruit above the total ability of all the packers to handle passes over the end of the conveyer where it falls a fraction of an inch into a trough of water and is reconveyed to the tank to be again taken up by the conveyer.

It is a great advantage to handle two or three kinds or sizes of fruit at the same time, which is accomplished by having that number of troughs emptying into the tank. Where it is desired to wash the fruit to get rid of spray residue, dust or the deposit of insects the period of the immersion of the fruit in the trough serves to loosen and soften the materials so that it is much more easily and quickly removed under the cleansing treatment.

By the use of this apparatus it is possible to go through all necessary processes from the picking box to the packed fruit without at any time dumping the fruit or letting one piece fall upon another which might either damage the fruit or cause stem punctures.

Also there is substituted for the usual belt conveyers liquid conveyers into which disinfectant for sterilizing the fruit, or solution for dissolving spray residue or the various deposits left by insect pests, may be placed.

It is also possible to get a full load of fruit on the conveyer, thus increasing the capacity of a given unit and conserving floor space.

It permits the sorting of the fruit by grades into a plurality of troughs of liquid, thus eliminating leaves, dirt, etc., and removing all culls before starting other processes.

It reduces labor by eliminating all hand work and transferring of fruit between the sorting and the packing, the packers working directly from the conveyer to the finished box or basket.

The liquid in the troughs is constantly circulated, or as it returns to the tank it is pumped out by the ordinary type of pump, such as, centrifugal, and returned to the mouth of the troughs in a stream, quantity of which is controlled by a valve. The amount can thus be varied according to the amount of fruit being deposited in the troughs.

I claim:—

1. In a fruit-handling apparatus, and in combination with conveying means for effecting the travel of the fruit therethrough, a flowing liquid stream adapted to receive the fruit and deliver it upon the conveying means, said stream also receiving from and returning to the conveying means an excess of fruit passed through the apparatus.

2. In a fruit-handling apparatus, and in combination with conveying means for effecting the travel of the fruit therethrough, a fruit receiving trough; a tank with which the trough communicates and in which said conveying means has its inception; a liquid body flowing through said trough and into the tank, adapted to receive the fruit and deliver it upon the conveying means, said liquid body also receiving from and returning to the conveying means an excess of the fruit passed through the apparatus.

3. A fruit-handling apparatus comprising a frame fitted with a treating element, and extended beyond said element as a worktable for the operatives; a traveling conveyer carried by said frame and adapted to advance the fruit through the treating element and along the work table; and a flowing liquid stream to receive the fruit and deliver it upon the conveyer.

4. A fruit-handling apparatus comprising a frame fitted with a treating element, and extended beyond said element as a worktable for the operatives; a traveling conveyer carried by said frame and adapted to advance the fruit through the treating element and along the work table; and a flowing liquid stream to receive the fruit and deliver it upon the conveyer, said flowing liquid stream having a course adapting it to receive an excess of fruit from the conveyer at the end of the work table and return it to said conveyer.

5. A fruit-handling apparatus comprising a frame fitted with a treating element; a traveling conveyer carried by said frame and adapted to advance the fruit through the treating element; a plurality of separate flowing liquid streams to receive fruit allotted to each and deliver said allotted portions separately upon said conveyer; and means in association with said conveyer to maintain the individuality of each allotment.

6. A fruit-handling apparatus comprising a frame fitted with a treating element, and extended beyond said element as a work table for the operatives; a traveling conveyer carried by said frame and adapted to advance the fruit through the treating element and along the work table; a plurality of separate flowing liquid streams to receive fruit allotted to each and deliver said allotted portions separately upon said conveyer, said streams having a course adapting them to separately receive from the conveyer at the end of the table an excess of said allotted fruit portions and return them to said conveyer; and means in association with said conveyer and work table to maintain the individuality of each allotment.

7. In a fruit-handling apparatus and in combination with conveying means for effecting the travel of the fruit therethrough, a flowing liquid stream adapted to receive the fruit and deliver it upon the conveying means, said stream carrying a cleansing component.

8. In a fruit handling apparatus fitted with treating elements of washing and drying nature, and in combination with conveying means for effecting the travel of the fruit through said elements, a flowing liquid stream adapted to receive the fruit and deliver it upon the conveying means, said stream carrying a cleansing component.

9. The method of handling fruit for shipment comprising depositing and advancing the fruit in and by a flowing liquid stream of a disinfecting nature, and then continuing its advance apart from said stream through a washing zone.

10. The method of handling fruit for shipment comprising depositing and advancing the fruit in and by a flowing liquid stream containing a disinfecting component, and then continuing its advance, apart from said stream, successively through a zone of washing liquid, and a drying zone.

11. The method of handling fruit for shipment comprising depositing and advancing the fruit in and by a flowing liquid stream of a disinfecting nature, and then continuing its advance apart from said stream through a drying zone.

12. A fruit-handling apparatus comprising a frame fitted with a treating element; a conveyer carried by said frame and adapted to advance the fruit through the treating element; a plurality of separate flowing liquid streams to receive the fruit allotted to each, each of said streams reaching and flowing over a separate area of the receiving end of the conveyer and each adapted to deliver its allotment upon its respective area; and means in association with said conveyer to maintain the individuality of each allotment.

13. A fruit-handling apparatus comprising a frame fitted with a treating element; a pair of troughs; a tank with opposite sides of which said troughs communicate; a conveyer rising from said tank and thence continuing through said treating element; a flowing stream of liquid in each trough, immersing the conveyer within the tank, and each stream adapted to deliver upon its respective side of the conveyer its allotted burden of fruit; and means in association with said conveyer to maintain the individuality of each allotment.

14. A fruit-handling apparatus comprising a frame fitted with a treating element, and extended beyond said element as a work-table for the operatives; and a conveyer carried by said frame and adapted to advance the fruit through the treating element and along the work-table.

In testimony whereof I have signed my name to this specification.

PAUL A. SCHERER.